United States Patent [19]
Loxley et al.

[11] Patent Number: 6,012,304
[45] Date of Patent: Jan. 11, 2000

[54] SINTERED QUARTZ GLASS PRODUCTS AND METHODS FOR MAKING SAME

[76] Inventors: Ted A. Loxley; John F. Blackmer; Klaus-Markus Peters, all of 3985 Ben Hur Ave., Willoughby, Ohio 44094

[21] Appl. No.: 08/804,234

[22] Filed: Feb. 22, 1997

Related U.S. Application Data

[63] Continuation of application No. 08/269,002, Jun. 30, 1994, which is a continuation-in-part of application No. 07/767,691, Sep. 30, 1991, Pat. No. 5,389,582.

[51] Int. Cl.$^7$ .................................................. C03B 20/00
[52] U.S. Cl. ............................... 65/111; 65/17.3; 65/17.6; 65/22; 65/30.1; 65/DIG. 8; 264/653; 264/654; 264/660; 264/666; 264/674; 264/681; 501/53; 501/54; 501/55
[58] Field of Search .................................. 501/12, 53, 54, 501/55; 65/17.2, 17.3, 17.6, 30.1, 22, 111, DIG. 8; 204/180.9; 264/66, 653, 654, 660, 666, 674, 681

[56] References Cited

U.S. PATENT DOCUMENTS

| | | | |
|---|---|---|---|
| 3,535,890 | 10/1970 | Hansen | 65/18 |
| 3,763,294 | 10/1973 | Nicastro | 264/57 |
| 3,775,077 | 11/1973 | Nicastro | 65/18 |
| 3,837,825 | 9/1974 | Loxley | 65/18 |
| 5,389,582 | 2/1995 | Loxley et al. | 501/4 |

FOREIGN PATENT DOCUMENTS 477977  4/1992  European Pat. Off. .

*Primary Examiner*—Anthony Green
*Attorney, Agent, or Firm*—Vincent A. Greene

[57] ABSTRACT

A number of unique processes are disclosed for manufacture of sintered high-purity quartz glass products in which a shaped silica body or preform is made from an aqueous slurry of micronized silica particles by gel casting, slip casting or electrophoretic deposition. The silica particles may comprise a major portion by weight of crystalline silica. In one embodiment of the invention the sintered quartz glass is transparent, substantially bubble-free and suitable for scientific or optical uses. In another embodiment the porous silica preform is fired in steam to increase the hydroxyl content and then nitrided in a nitrogen-hydrogen reducing atmosphere. A minute amount of chemically-combined nitrogen in the high-purity quartz glass is sufficient to provide a tremendous improvement in physical properties and an incredible increase in the resistance to devitrification.

12 Claims, No Drawings

SINTERED QUARTZ GLASS PRODUCTS AND METHODS FOR MAKING SAME

The present application is a continuation of copending application Ser. No. 08/269,002, filed Jun. 30, 1994, which is a continuation-in-part of application Ser. No. 07/767,691, filed Sep. 30, 1991 (now U.S. Pat. No. 5,389,582).

The present application relates to the manufacture of quartz glass products having new or improved properties and to novel processes for making such products from porous silica preforms. One preferred embodiment of the invention involves nitrided vitreous quartz products with outstanding physical properties. Other embodiments involve the use of silicon alkoxides, such as ethyl silicate (TEOS), for impregnation of porous silica preforms prior to nitriding or sintering of the preforms and for gel-casting of quartz glass products. Another embodiment involves the making of quartz glass articles by electrophoretic deposition. Another involves the production of such glass articles by slip casting in special silica molds.

BACKGROUND OF THE INVENTION

It has been known for many years that nitrides of silicon have properties different from silicon dioxide and that some of these properties might be advantageous in certain applications. Silicon nitride and silicon oxynitrides can be produced in various ways as by reaction of silicon and/or silicon dioxide with ammonia, and products of this type would have utility for some special applications.

However, there are many reasons why the commercial use of such products has been very limited, why research relating to nitrided silicon products has not been extensive, and why large capital investment for research and development in this area did not appear to be justified. It is difficult and expensive to produce silicon nitride products or silicon oxynitride products. Silicon dioxide (silica) does not react readily with nitrogen, although it is possible with appropriate reaction conditions to produce oxynitrides by reacting particles of silica with anhydrous ammonia.

In the field of microelectronics, scientists have given some consideration to possible uses of silicon oxynitride films because of the unique dielectric properties and other properties. Such films can be produced by chemical vapor deposition or by nitridation of silicon surfaces or thin silicon-dioxide films. Thin silica films made by a sol-gel process can be penetrated by ammonia, perhaps because of the microporosity and cracking of the dried film. At a temperature of 1000° C. to 1200° C., anhydrous ammonia can react with the silica film to produce oxynitrides with special properties.

Consideration has also been given to the manufacture of glass or glass-ceramic products from compositions containing silica ($SiO_2$) and nitrogen (N) as base components as described in Corning U.S. Pat. No. 4,222,760. However, that patent points out that the practical glass-forming region is quite small in the simple ternary $SiO_2$—$Al_2O_3$—N system (FIG. 8) and is essentially non-existent in the simple binary $SiO_2$—N system.

Silicon oxynitride glasses can be produced by melting a mixture of oxide and nitride powders at a high temperature, such as 1600° C. to 1700° C. or more. Oxides of aluminum and other metals may be used (i.e., Ca, Li, Mg or Y). The nitrogen source may be $Si_3N_4$ or AlN, for example. The oxynitride glass is potentially useful in making special plate glass or glass fibers (See U.S. Pat. No. 4,609,631).

Oxynitrides have some desirable properties which may be superior to those of quartz glass and may have potential value in the semiconductor industry. However, it appears that such potential, if any, has yet to be realized and that the use of oxynitride glass in connection with the commercial manufacture and processing of silicon-wafers and other semiconductor devices has not been found worthwhile.

To date there has been no practical substitute for quartz glass in the commercial manufacture of silicon semiconductors. The modern glass crucibles used in Czochralski (Cz) crystal-growing furnaces have been formed of silica having a very high purity (i.e., a purity of at least 99.99 percent). Substantial amounts of nitrogen cannot be tolerated in Cz crucibles. For more than two decades the manufacturers of silicon crystal have insisted that the crucibles used in crystal-growing furnaces be transparent and free of significant amounts of nitrogen or cristobalite.

Because of the importance of microelectronics and computers, there is a high demand for ultra-pure silica glass in the manufacture of modern micro-chips. The semiconductor industry is becoming increasingly intolerant with respect to contaminants in quartz glass. In order to meet modern requirements for the processing of semiconductor wafers, a glass should contain at least 99.995 percent by weight of silica. The ultra-pure synthetic fused quartz commonly used for this purpose usually has a purity of about 99.999 percent.

Prior to the present invention, the presence of significant amounts of chemically-bound nitrogen in a quartz glass used in semiconductor manufacture would have been considered highly undesirable. Nitrogen heretofore appeared to be an impurity to be avoided.

The percentage of the nitrogen impurity in a commercial quartz glass is low but is not often measured or reported because of the difficulty of ascertaining the nitrogen content with reasonable accuracy. The analytical detection problem is another good reason why the unusual properties and advantages of chemically-bound nitrogen were heretofore not understood nor appreciated in the glass industry.

For several decades vitreous silica products essentially free of crystalline silica have been used extensively because of exceptional thermal shock resistance and other advantageous physical properties. However, these products have a limited useful life when heated above 1200° C. and other disadvantages because of limited resistance to deformation, the devitrification of the glass, and the damage resulting from the crystallographic alpha-beta inversion during heating and cooling of the devitrified glass. There has been a need for a practical solution to these problems for several decades, particularly the devitrification problem, but no simple solution was found prior to the present invention.

There has also been a need to remedy other deficiencies in certain products and processes involving the use of quartz glass or vitreous silica. For example, serious problems have been encountered when attempting to cast elemental silicon in silica molds, making it necessary to tolerate the expense and inefficiency of temporary breakaway casting molds.

In the semiconductor industry, modern epitaxy reactors, diffusion furnaces, CVD equipment and other high-temperature equipment have a great need for effective thermal radiation heat shields. There have been some attempts to meet this need, but they have been crude and generally unsatisfactory.

Gel Casting

There has also been a need for better methods for molding high-purity quartz glass products including improvements in conventional slip casting methods. Because of the limitations of slip casting, other practical casting processes and techniques are sorely needed, such as electrophoretic deposition and gel-casting, (See U.S. Pat. Nos. 4,092,231 and 4,622,056), but this need has not been satisfied. Prior to the present invention, there was no practicable and commercially viable method for gel casting a variety of shaped quartz glass products.

In the field of glass and ceramics, ethyl silicate has been used for more than 50 years as a binder (See U.S. Pat. No. 1,909,008). The use of alkyl silicate binders is a feature of the well-known "Shaw Process" developed by Avnet-Shaw Corporation and disclosed, for example, in U.S. Pat. Nos. 2,795,022 and 3,172,176. Ethyl silicate binders are commonly used in the manufacture of various silica products. Ethyl silicate can be added to a slurry in small amounts and hydrolyzed to serve as a binder and can be used in various injection, extrusion and pressing techniques as described in U.S. Pat. No. 3,423,216 and U.S. Pat. No. 4,789,389, for example. Although the properties and uses of ethyl silicate have been well known for decades, the full potential of this material in the manufacture of glass has not been realized nor appreciated.

It has been known for several years that ultra-pure synthetic quartz glass can be produced by sol-gel techniques or by the hydrolysis of a silicon chloride or a silicon alkoxide (See U.S. Pat. No. 4,572,729). Optical glass is commonly made by flame hydrolysis of silicon tetrachloride (See Corning U.S. Pat. No. 3,806,570). The typical synthetic fused quartz has a purity of 99.995 percent or greater.

Silicon alkoxides, such as tetraethyl-orthosilicate (known as TEOS or ethyl silicate), can be employed in a sol-gel process for manufacture of ultra-pure quartz glass as disclosed in U.S. Pat. Nos. 4,572,729 and 4,789,389. In the latter, a gel formed from hydrolyzed TEOS is dried to produce small granules which are then sintered to produce ultra-pure synthetic fused quartz. The ultra-pure quartz granules made in this way are then wet milled to form a slurry and used to form a shaped porous green body or preform by slip casting, injection molding or other casting methods. According to the patent the green body may be sintered to full density in a vacuum furnace and thereafter placed in a hipping furnace (e.g., See U.S. Pat. No. 4,349,333). The hot isostatic pressing typically involves a pressure of at least 1,000 psi to eliminate gas bubbles in the glass.

Heretofore, various sol-gel processes have been proposed for casting of shaped silica bodies. They involve casting a "green" silica body, drying the body, and firing or sintering the body to form a dense silica product. For example, in U.S. Pat. Nos. 4,680,046 and 4,680,048, a sol-gel casting process is disclosed in which ultrafine particle silica, such as fumed silica, is added to a hydrolyzed ethyl silicate to enhance the yield and to reduce the porosity of the dry gel (See U.S. Pat. No. 4,680,046). The ultrafine silica particles tend to cause the glass to foam, but such tendency is reduced by selecting the proper amount to be added (See U.S. Pat. No. 4,680,045). The ultrafine silica may be a commercial fumed silica, such as Aerosil or Cab-O-Sil, or a comparable silica made in a different manner, as by flame hydrolysis of silicon tetrachloride (See U.S. Pat. No. 4,801,318).

Unfortunately the sol-gel casting processes heretofore proposed have been disappointing and have suffered from serious problems, particularly the cracking and shrinkage problems described in said U.S. Pat. No. 4,789,389. Such processes have not met with commercial acceptance or success and have not provided a competent, reliable and practical method for casting shaped quartz glass products. They have failed to satisfy the important needs of the industry.

For these reasons, as pointed out in said U.S. Pat. No. 4,789,389, sol-gel techniques have been employed for manufacture of ultrapure synthetic quartz granules rather than for commercial gel casting of quartz glass products.

Electrophoretic Deposition

Electrophoresis has been known for more than 100 years and has been used in a variety of ways as a technique for the coating of metal articles. This technique has been employed for depositing metals, oxides, phosphors, rubber, paints, polymers and other materials using both aqueous and non-aqueous media. It has been used extensively in the commercial manufacture of rubber products from latex and in automotive painting.

In the ceramic manufacturing industry, the use of electrophoretic deposition has been rather limited. There are a few processes which have had substantial commercial value. One involves the electroforming of beta-alumina articles for use in high-energy sodium-sulfur and sodium-halogen batteries (see U.S. Pat. No. 3,946,751) and another involves the formation of thin continuous strips of clay, suitable for cutting into tiles or plates (see Chronberg U.S. Pat. Nos. 4,092,231 and 4,170,542). So far the use of the Chronberg process for manufacture of ceramic tile from clay suspensions has not been fully exploited.

Electrophoretic deposition is well suited to the manufacture of beta-alumina articles by the process described in U.S. Pat. Nos. 4,073,711 and 4,279,725 (General Electric). In that process an organic suspension of betaalumina particles is employed using amyl alcohol as the liquid media because of its dielectric properties. The particles are deposited on an electrically-charged mandrel to form thin-walled tubes with a diameter of about 1 centimeter and a wall thickness of about 1 millimeter as described in U.S. Pat. No. 4,279,725.

Electrophoresis has also been proposed as a method for speeding up the slip casting of clay earthenware or pottery as disclosed in U.S. Pat. Nos. 3,718,564 and 4,121,987. It has also been proposed for the manufacture of porcelain articles and porcelain-coated articles (see U.S. Pat. Nos. 3,484,357; 3,575,838 and 4,708,781).

The electrophoretic processes described above for use in forming of ceramic articles commonly employ aqueous suspensions containing additives, such as polyacrylic acid, triethylamine, ethanol, sodium carbonate, sodium hydroxide, sodium silicate, surface-active agents, deflocculants, etc.

In general, organic liquids are considered superior to water as a suspension medium for electrophoretic forming. The use of water-based suspensions causes a number of problems including gas evolution at the electrodes. This can cause bubbles to be trapped within the deposit. Special means have been proposed to minimize this bubble problem as by using a porous membrane and depositing the particles on the membrane as disclosed in U.S. Pat. Nos. 4,684,386 and 4,689,066. The bubble problem is less serious when using an organic suspension instead of an aqueous suspension.

The latter patents (U.S. Phillips Corporation) relate t6 the manufacture of thin-walled quartz-glass tubes for optical waveguides. U.S. Pat. No. 4,689,066 describes manufacture of a transparent glass tube with a diameter of 19 mm and a wall thickness of 1.2 mm from an homogenized anhydrous suspension of colloidal silica containing a quaternary ammonium compound. The organic media may be ethanol. The silica particles typically have a particle size of 15 to 100 nanometers (0.015 to 0.1 microns) with an average particle diameter of about 40 nanometers.

Electrophoretic deposition of coatings and the formation of thin-walled articles from colloidal silica can be feasible if the deposit is relatively thin. However, the deposited coating loses its conductance as the thickness of the deposit increases, thus retarding the rate of deposition. Because of this self-limiting characteristic, the buildup in the electrical resistance of the deposit can be a major problem when attempting to produce articles with substantial wall thickness.

There are a number of reasons why electrophoretic forming processes have so far achieved little commercial success. There are serious shortcomings in the fundamental understanding of the subject, and it is difficult to predict whether a given suspension will deposit electrophoretically in the desired manner. Laboratory testing has indicated that a large number of different powders can be deposited including barium and calcium carbonates, alumina, magnesia, zinc oxide, silica, titanium dioxide, indium oxide, tungsten carbide and various metals and phosphors.

It would be desirable to be able to predict from suitable parameters whether an electrophoretic deposition process will produce the desired results. The most commonly used parameters are zeta potential and electrophoretic mobility, but zeta potentials are difficult to measure or to interpret. Unfortunately there is no satisfactory theory that covers and explains all observations on electrophoretic deposition, and the subject is not well understood. Theoretical mathematical analysis has been attempted but is questionable because the equations used are based on assumptions regarding particle size and shape and theoretical models of doubtful validity (e.g., conveniently assuming that the charged particles are spherical when that is not true).

It appears that, because of lack of adequate information, misconceptions, prior failures, lack of experience or other reasons, the versatility of the advantages and potential advantages of electrophoretic deposition in the manufacture of improved glass and ceramic products were heretofore not appreciated prior to the present invention. In any event, research and development work in the field of electrophoretic deposition has been neglected, and the ceramic industry has relied on other forming processes.

In the field of investment casting where refractory shell molds are formed by the usual "lost-wax" process, it has been suggested that electrophoresis be employed during manufacture of the shell molds as disclosed in Szabo U.S. Pat. Nos. 3,850,733 and 3,882,010. In the proposed Szabo process the wax patterns are coated with graphite and dipped in an electrically-conductive coating suspension. The Szabo patents recognize that gas evolution at the anode or depository electrode creates major problems and that it is difficult to provide reliable results by electrophoretic deposition. These patents do not provide a reliable and commercially satisfactory process of substantial importance.

The problems associated with electrophoretic deposition are discussed in Norton U.S. Pat. No. 4,357,222 including the major problem of gas formation at the depository electrode (anode) from electrolysis of the slip liquid which causes serious flaws in the cast part. The Norton patent minimizes this bubble problem by providing a special non-conducting rubber mold having a relatively small anode at the bottom of the mold which forms only a small fraction of the forming surface of the mold and by moving one electrode relative to the other. A spherical casting of substantial size can be molded by filling the mold cavity with a suitable casting slip such as a suspension composed of about 86 percent by weight of silicon carbide, about 14 percent by weight of water and 0.1 percent by weight of sodium silicate. If the mold cavity is filled with a slip composed of about 50 percent water, about 50 percent elemental silicon and about 0.5 percent sodium silicate, a silicon casting is produced which can be converted to silicon nitride by standard nitriding.

The stability of the slip is less important in the non-conducting rubber mold of the Norton patent because the depository anode is at the bottom of the mold and attracts the particles in the same direction as gravity.

Unfortunately the Norton process has very limited utility and is unsuitable for formation of thick-walled articles, such as tanks, crucibles or other receptacles, where gravitational force can cause serious adverse effects.

For many years there has been a need for a simple, versatile and efficient process for commercial manufacture of relatively thick quartz glass products from fine silica particles. The electrophoretic deposition processes described in the prior art discussed previously fail to meet this need.

Slip Casting

Slip casting is today the most practical process for forming quartz glass articles from fine silica particles. For at least several decades, conventional slip casting in plaster of Paris molds has been used in the semiconductor industry to make transparent Cz crucibles and other quartz glass receptacles of the highest quality with a purity from 99.95 to 99.99 percent or greater. Such crucibles are also produced commercially in rotating molds by arc-fusion methods which can be advantageous when producing crucibles or receptacles with a substantial wall thickness in excess of 0.3 inch. However, arc-fusion cannot be used to make trays or receptacles having flat bottom or side walls and non-circular shape as are commonly produced by slip casting. Almost all of the silica crucibles used by the semiconductor industry in modern Cz furnaces for silicon crystal manufacture are high-purity quartz glass crucibles produced either by arc-fusion methods or by conventional slip casting in plaster molds.

The standard plaster of Paris molds used in slip casting are a marvel and have enjoyed unparalleled success for many decades. Such molds have a unique and incredible open-cell structure which is almost ideal for slip casting and which is unmatched by any other material proposed for a comparable use. The conventional plaster molds provide a unique combination of high porosity and uniform small pore size and enjoy the excellent capillary action needed for practical aqueous slip casting.

Other inorganic and organic materials have been proposed for use in slip casting molds, such as graphite and synthetic polymers (i.e., plastics), but they are inferior and do not provide comparable capillary action. Such proposals do not involve an improvement with substantial significance or importance in the commercial manufacture of high-purity quartz glass products for the semi-conductor industry.

While conventional plaster of Paris molds have satisfied the needs of the semiconductor industry with respect to the important quartz glass products, they have obvious limitations. They are generally unsuitable for slip casting at a pH below 7 and usually function best when using aqueous slips with a pH of 7.5 or so. With such plaster molds it is possible to produce quartz glass receptacles and transparent Cz crucibles of the highest quality with an ultrapure inner surface, but slip casting in such plaster molds can be inefficient, uneconomical, or unsatisfactory if the receptacle being formed has a relatively thick wall. It may require 6 to 8 hours or more to slip cast a silica preform with a wall thickness of one-half inch or so. If the wall thickness of the desired silica product is doubled, it may take more than four times as long to perform the slip-casting operation.

This problem has been recognized for several decades and attempts have been made to speed up the slip-casting operation, but a practical and commercially satisfactory solution to the problem was not found. Heretofore, attempts to find a satisfactory substitute for plaster of Paris molds in the slip casting of silica glass products have been found wanting.

Conventional plaster molds have other limitations and disadvantages which are inherent and perhaps cannot be eliminated. The strength and useful life of a plaster mold is limited. The mold can be seriously damaged if it is subjected to high temperature or dried at a rapid rate. Plaster of Paris molds should be dried at a moderate temperature of about 45° to 50° C. A typical drying operation is necessarily very slow and usually requires at least two days.

Helium-sintered Quartz Glass

During the last two decades sintered transparent quartz glass articles, such as Cz crucibles, acid tanks and other receptacles, have been manufactured by a process of the type disclosed in U.S. Pat. No. 4,072,489 wherein a porous silica body or preform formed by slip casting is dried and fired and later sintered rapidly in a helium atmosphere to full density on a perforated shaping mandrel in an induction furnace. Semiautomatic equipment similar to that shown in said patent was employed with cycle times of 6 to 15 minutes depending on the size of the glass article. The short cycle minimized the amount of devitrification during sintering, and the sintering temperature was raised above 1720° C. and above the melting point of cristobalite to produce a full density transparent glass.

The above process was used commercially to avoid excessive manufacturing costs and provided admirable results, but the transparent quartz glass contained substantial amounts of undesirable voids or gas bubbles and usually had unsatisfactory optical properties. The causes of the larger bubbles were not fully understood and a satisfactory solution to the problem was not found prior to the present invention. The transparent glass products commonly contained significant numbers of visible bubbles with diameters from 150 to 400 microns or more and were unacceptable to many customers for this reason.

For many years there has been a great need for a reliable and economical commercial process to produce transparent helium-sintered quartz glass products with a minimal bubble content and a minimal number of visible bubbles.

SUMMARY OF THE INVENTION

One preferred embodiment of the present invention relates to the nitriding or nitridation of porous silica preforms and involves new technology which appears to be a giant step forward and a breakthrough of potentially great importance in the field of nitrogen-containing silica or silicon oxynitrides. Incredible improvement in the physical properties of a high-purity quartz glass can be obtained by incorporating a minute amount of chemically-bonded nitrogen in the silica.

The present invention also involves the use of silica sols, particularly those made by hydrolyzing silicon alkoxides, such as ethyl silicate (TEOS). One preferred embodiment relating to the gel casting of high-purity silica glass is very important because of the great need for such a casting process as an alternative to slip casting and the elimination of the calcium contamination problems associated with conventional slip casting. The unique gel-casting process happens to be well suited to the production of nitrided quartz glass according to the first-named embodiment, or ultra-pure transparent bubble-free quartz glass according to another embodiment of the invention. It can also be used to make special high-porosity silica molds remarkably well suited for use in slip casting.

Another embodiment relates to a unique electrophoretic deposition process particularly advantageous in the commercial manufacture of quartz glass products with walls of substantial thickness.

Nitrided Quartz Glass

Said first embodiment is remarkable not only because of the difficulty in forming substantial amounts of chemically-bound nitrogen but also because of the difficulty in measuring or detecting the amounts being formed or in ascertaining any benefits therefrom. The improvement obtained in the resistance of quartz glass to devitrification was quite unexpected.

In accordance with this invention various measures are taken to promote nitridation of silica including the use of ammonia, the incorporation of catalysts, such as calcium, the use of high pressures, and the pretreatment of the silica to provide surface reactive groups, such as hydroxyl or halogen groups. Carbon monoxide is also employed to advantage. However, it is difficult to incorporate more than a very small amount of such reactive groups in a porous silica preform of the type used to form typical quartz glass products and difficult to incorporate substantial amounts of chemically-bound nitrogen in a quartz glass. It is also impractical to employ extremely expensive equipment to provide the high pressures which are desirable for effective nitriding.

The present invention does not require such expensive equipment. In one embodiment pressure is created within closed pores (or bubbles) of the glass by the surface tension of the glass surrounding the pores.

For example, in carrying out the invention of said first embodiment, a silica preform formed from fused quartz particles by slip casting or other suitable method and having a porosity of 10 to 40 volume percent can be dried, hydroxylated by firing in air containing steam, and then nitrided in anhydrous ammonia at a high temperature, such as 1000° C. to 1200° C. The nitrided preform can then be presintered for 1 to 3 hours or more at a temperature of 1400° C. to 1500° C. to increase the density above 90 percent and to close the pores before the final sintering to a temperature above 1700° C. The chemical bonds between the nitrogen atoms and the silicon atoms tend to be unstable at temperatures above 1500° C., and pressure is created by the nitrogen as a result of that instability. The opposing pressure needed to maintain stability results from the surface tension of the glass as further explained hereinafter.

Gel Casting

The second important embodiment of the present invention relates to a gel-casting process for making quartz glass products, the basic features of which are disclosed in copending application Ser. No. 07/767691, filed Sep. 30, 1991 (now U.S. Pat. No. 5,389,582).

Said copending application refers to the gel-casting process of the inventor, Ted A. Loxley, which involves in situ hydrolysis of a silicon alkoxide (e.g., ethyl silicate) in a slurry or slip containing micronized particles of vitreous silica. The slurry has a high solids content of at least 80 percent by weight before the ethyl silicate is added.

In carrying out the invention of this second embodiment, a conventional slurry is preferably prepared in a ball mill as typically used for slip casting of quartz glass. The water in the slurry (e.g., from about 15 to about 20 percent by weight) is employed for in situ hydrolysis of the ethyl silicate (TEOS) which is added to the slurry. The mole ratio of water to ethyl silicate is at least about 2:1 and is usually from 3:1 to 6:1. An acid, such as hydrochloric acid, formic acid or nitric acid, may be employed to promote the hydrolysis during extended mixing.

Before the slurry containing the hydrolyzed ethyl silicate is poured or fed into a mold, the pH is adjusted by adding a weak base, such as morpholine or urea, to initiate gelling. After gelling, the casting can be dried and fired to produce a porous silica body or preform with a porosity of from 15 to 40 volume percent. Such a preform is well suited for manufacture of nitrided quartz glass using the various techniques described above with respect to said first-named embodiment of the invention. Such a porous body or preform with a porosity of about 25 to 30 volume percent and a network of open pores of minute size (e.g., from about 1 to 4 microns) is remarkably well suited for use in slip casting.

Helium-sintered Quartz Glass

Other embodiments of the present invention relate to the manufacture of transparent quartz glass products with a reduced bubble content and particularly helium-sintered products with a minimal bubble content or with sound optical properties.

A third preferred embodiment of the present invention involves the impregnation of a porous silica preform formed by slip casting, isostatic pressing, electrophoretic deposition or gel casting, for example. After drying and firing, the preform is soaked in or thoroughly impregnated with a suitable silica sol (e.g., a hydrolyzed silicon compound, such as TEOS), and then gelled, dried and fired before a subsequent nitriding treatment or a final sintering in an induction furnace. This procedure reduces the porosity of the preform at least 2 volume percent.

It has been discovered that such impregnation of the porous preform with a hydrolyzed silicon alkoxide (e.g., ethyl silicate) provides important advantages in the commercial manufacture of transparent quartz glass receptacles, such as crucibles, bell jars and acid tanks. For some reason such treatment of the preform improves the purity of the product by helping to remove sodium ions and other metal ions. It also facilitates the sintering operation and makes it possible to reduce the formation of gas bubbles in the glass during the final helium sintering operation.

The larger pores of a slip-cast silica preform are more apt to cause significant gas bubbles in the sintered glass. These large pores soak up the hydrolyzed alkyl silicate and permit gelling thereof inside the pores. The result of the alkyl silicate impregnation seems to be a smaller and more uniform pore size, better suited to the production of transparent quartz glass which has a minimal bubble content.

Other means may be employed to reduce the bubble content of the quartz glass. It has been found that the average bubble diameter can be greatly reduced and that the number of visible voids or bubbles can be drastically reduced by avoiding the use of plaster of Paris molds. These advantages are obtained, for example, when the plaster molds used for slip casting are replaced by silica molds as described hereinafter.

Other modifications in the production process can be helpful in minimizing the bubble problem including changes in the slurry and in the sintering procedures. It can be advantageous to sinter the fired porous silica preform in two stages over a substantial period of time rather than in a single furnace in 6 to 12 minutes as in U.S. Pat. No. 4,072,489. Rapid sintering to a temperature of 1600° C. to 1750° C. according to said patent is non-uniform and intended to provide a temperature gradient. In a two-stage process wherein the preform is first sintered for 30 minutes to 3 hours or more at a temperature of from about 1400° C. to about 1500° C., the first-stage of the sintering causes more uniform heating of the silica and promotes the formation of cells with a more uniform pore size.

A two-stage process is particularly effective when the porous preform is mounted on a porous or perforated mandrel and flushed with helium at a temperature of at least 1400° C. for 20 to 30 minutes or more during the first stage sintering. It has been discovered that such pre-sintering in helium at least 1400° C. at a temperature of 1450° to 1600° C. followed by the standard helium sintering for 5 minutes or more to a temperature of 1750° C. can produce superior transparent quartz glass with a minimal bubble content.

The two-stage sintering process can be carried out in such manner as to cause a substantial increase in the density of the preform and/or to seal the pores thereof during the first stage. The first-stage sintering can be carried out for 1 to 3 hours in an atmosphere of helium or in a vacuum at a suitable low pressure (preferably below 5 torrs)to increase the density to at least 90 percent. If the density of the preform is increased to 95 volume percent or so to close and seal the pores, then the second-stage sintering in the induction furnace can be carried out in an atmosphere of argon or other inert gas.

For example, as described hereinafter (See EXAMPLE V), the first-stage sintering can be carried out in a vacuum by heating the porous silica preform to a temperature of from about 1400° C. to 1500° C. for a period of time sufficient to increase the density to about 95 percent and to close the pores of the quartz glass. The second-stage sintering of the preform can then be carried out in an inert atmosphere in accordance with EXAMPLES I and V wherein the glass temperature is increased from below 1400° C. to more than 1700° C.

A typical two-stage process for making transparent quartz glass comprises preparing a porous silica preform from a slurry (as in EXAMPLE I) consisting essentially of at least about 80 percent by weight of high-purity micronized silica particles and up to about 20 percent by weight of water, drying and firing the preform, presintering the fired preform for at least about one-half hour at a temperature of from about 1350° C. to about 1600° C. and thereafter sintering the glass to full density by heating it to a temperature above 1700° C.

Nitrided Glass

In carrying out the invention of the first-named embodiment, a shaped silica body or preform with a porosity of 10 to 40 volume percent is formed from a refractory silica composition or a slurry of fine silica particles by slip casting, gel casting, electrophoretic deposition, isostatic pressing, injection molding or other suitable method (see U.S. Pat. Nos. 3,222,435 and 3,619,440). The porous silica preform is formed and treated in such a manner that, after drying and firing, it contains a substantial amount of chemically-bound hydroxyl groups and/or other suitable surface reactive groups (e.g., at or near the inner surfaces of the pores) which promote nitridation of the silica. These reactive groups are usually hydroxyl or silanol groups rather than halogen groups. The fired porous silica preform is then nitrided in a nitrogen reducing atmosphere (e.g., an atmosphere of anhydrous ammonia maintained at a suitable high temperature from 850° C. to 1200° C.). To assure that the pores of the preform are filled by the ammonia gas or a mixture of nitrogen gas and hydrogen gas, a substantial vacuum can be employed to remove air or other gas from the pores of the preform before the ammonia or other nitrogen-containing reducing gas is introduced to those pores. Also a pressure differential can be provided to force the ammonia or nitrogen gas through the porous preform.

The final sintering of the preform to a high density, such as 98 to 99 weight percent, can be carried out in an electric induction furnace generally as disclosed in U.S. Pat. No. 4,072,489 using a nitrogen atmosphere rather than an atmosphere of helium. The glass is usually heated to at least 1700° C. during sintering and is preferably heated to about 1750° C. or above the melting point of cristobalite to eliminate crystalline silica.

The porous silica preform can be treated prior to nitridation to obtain improved results. The treatment can include impregnation with a hydrolyzed silicon alkoxide as described hereinafter and can include a hydroxylation treatment to increase the number of hydroxyl groups, silanol groups or other reactive groups which promote nitridation (e.g., chemical bonding of nitrogen to silicon atoms). In a preferred embodiment of the invention, the porous preform is heated in a furnace atmosphere of air or oxygen and steam to a high temperature, such as 400° C. to 1100° C., to effect a substantial increase in the hydroxyl content of the glass prior to the nitriding step.

Optionally the porous silica preform can be impregnated with a hydrolyzed silicon alkoxide, such as TEOS, dried, and fired before the above-described steam treatment or the nitriding operation.

A number of unique and remarkable products can be produced when practicing the present invention. Nitrided quartz glass products made according to the invention exhibit remarkable physical properties and can be of great commercial value. The nitridation of a porous vitreous silica preform in accordance with the invention apparently causes nitrogen atoms or amine groups to become chemically bonded to surface silicon atoms of the vitreous silica, thereby effecting a remarkable change in the physical properties of the quartz glass even when the nitrogen content is barely measurable (e.g., below 0.005 percent by weight).

The resistance of the quartz glass to devitrification at high temperatures (e.g., 1100° C. to 1300° C. or higher) and the useful life of the glass under harsh conditions can be drastically improved by nitridation, perhaps more than fifty-fold and possibly two orders of magnitude. At the same time the high-temperature viscosity or resistance of the glass to deformation at high temperatures, such as 1400° C. or higher, can be increased dramatically. Because of their remarkable properties, nitrided quartz glass products made according to the invention are valuable for a wide variety of uses in the chemical and electronic arts and other scientific arts and include bell jars, crucibles, tanks, trays, and plates and tiles for furnaces, reactors and hot-wall applications. Such products are particularly useful in the semi-conductor industry and the field of microelectronics because of extreme purity, uniformity and reliability.

The nitrided quartz glass of this invention with a density from 98 to 99.5 percent by weight or more and a silica content of at least about 99.99 percent by weight is remarkably well suited for some special applications. The nitrided glass seems to have unique surface characteristics not possessed by conventional quartz glass. It has been found that the nitrided glass, unlike conventional quartz glass, is suited for use as a permanent shaping mold for casting molten high-purity silicon, thereby eliminating the need for disposable breakaway molds which were heretofore used in molding silicon ingots.

The opaque nitrided quartz glass of this invention is particularly valuable for radiation heat shields used in CVD furnaces for chemical vapor deposition and in epitaxy reactors, diffusion furnaces and other furnaces used in the semiconductor industry. Such glass is extremely well suited for such uses. In epitaxy reactors, for example, the new high-density heat shields of this invention are so superior to those previously used that the old shields are considered impractical.

The heat shields of the present invention are remarkable in many ways. They normally have a high density from 98 to 99 percent by weight, usually at least 98.4 percent. This minimizes the contamination problem. This invention involves the discovery that small pores of minute or micron size provide optimum resistance to radiation. When the pores have a small diameter, such as 1 to 3 microns, and a large number of pores have a diameter which is close to the wave length of the radiation, the efficiency of the heat shield can be very high.

This invention is remarkable in that it makes possible formation of an almost ideal network of small cells. This is made possible by providing amine groups or nitrogen atoms which are apparently bonded to silicon atoms and which are unstable at the higher sintering temperatures so as to create a vapor pressure adequate to resist the compressive forces due to the surface tension of the glass. The result is white, opaque glass of high density with pores having a minute size (e.g., 1–4 microns). If the density is increased from 98.5 percent to full density in a hipping furnace, the glass can become transparent.

Electrophoretic Deposition

Another embodiment of the present invention relates to the formation of porous silica preforms by a unique electrophoretic deposition process wherein a mold with an electrically conductive shaping surface is immersed in an aqueous suspension or slip substantially free of ionic impurities and containing electrically-charged micronized particles of high-purity silica. At least a portion of the slip is preferably agitated to provide more uniformity during the deposition process using suitable means, such as an ultrasonic transducer or a rotary mixer, to maintain the silica particles in suspension.

The particle size of the high-purity fused quartz is kept within predetermined ranges so that the deposits on the metal molding surface (anode) are highly porous and do not adversely affect the rate of deposition as the deposit becomes relatively thick (e.g., from 1 to 3 centimeters or more).

In another embodiment of the invention, the porous silica preform is formed with layers of different composition. A quartz glass receptacle, for example, can be produced with an ultrapure inner layer. If the silica preform for such a receptacle is formed of three layers and the outer layers have a coefficient of expansion less than that of the middle layer, then after sintering, the outer layers of the glass will be under compression. This makes possible the production of tempered glass with exceptional durability.

The electrophoretic deposition process of the present invention is particularly well suited to the production of multi-layer silica preforms of substantial thickness. An electrically-conductive shaping mold (positive anode) can easily be immersed in several different slurries to cause the deposit of layers of any desired thickness. This permits the economical manufacture of special engineered silica glass products with improved properties and may make it possible to take advantage of the unrealized potential of glass or to eliminate or reduce some of the flaws which limit the strength and utility of most glass products.

Slip Casting

Another embodiment of the present invention relates to the use of special porous silica molds for slip casting of quartz glass products. Such molds have unusual and unexpected advantages.

It has been discovered, for example, that there is a remarkable and unexpected reduction in the time required to slip cast a porous silica preform when using a special high-porosity silica mold rather than a conventional plaster of Paris mold.

If a silica preform is produced from a suitable slip containing micronized particles of high-purity silica by the gel-casting process of the present invention, it is possible to provide the preform with a high porosity of 20 to 30 volume percent and a highly uniform network of open pores of small size (e.g., a pore size of from 1 to 4 microns). It has been discovered that this special internal open-pore structure is extremely well suited for slip casting, if the porous silica preform is used as a forming mold, and that the capillary attraction is superior to that obtained when using conventional plaster of Paris molds. The capillary action in silica molds is apparently enhanced by the hydrophilic internal surfaces and also by microcracks in the mold.

Unlike plaster molds, a porous silica mold can be heated to a temperature of 1000° C. or more to provide the desired strength and can be treated at high temperatures to modify or improve the mold structure or the character of the internal surfaces or to remove impurities. Unlike plaster molds, which are usually dried for two days or more at a temperature below 50° C., the silica mold can be dried in 30 to 40 minutes or so at a temperature above 250° C. Like the conventional plaster molds, the silica molds are economical and reliable and can be made at reasonable cost in a variety of sizes and shapes.

It has also been discovered that the bubble content of transparent helium-sintered quartz glass can be greatly reduced by using silica molds instead of the typical plaster molds to slip cast the preform.

When using silica molds in accordance with this invention, a novel system can be used to improve efficiency and to assure that the quartz glass products produced have the desired high quality. The preferred procedure is to dry the silica mold after each slip casting operation has been completed and after the slip-cast preform has been separated from the mold. The typical cup-shaped open-top silica mold is turned upside down, placed on a flat horizontal surface, and heated to a temperature of 250° to 400° C. or higher in such a manner as to create a temperature gradient and to cause radial outward flow of gases through the open-pore network, thereby removing unwanted impurities or causing them to move away from the inner surface of the mold. Relatively inexpensive heating means can be supported above the silica mold to heat its outer surface to the desired temperature (e.g., 250° to 300° C.).

After the silica mold is dried, it is then ready for the next slip casting operation. The dried silica mold provides a remarkably strong capillary attraction and can greatly reduce the time required to produce a typical silica preform (e.g., with a wall thickness of 5 to 8 millimeters).

DEFINITIONS AND TERMINOLOGY

This invention is concerned with fused quartz and quartz glass containing a high percentage of silica as can be produced from quartz sand or from synthetic quartz of even higher purity. Quartz glasses commonly contain 99.5 to 99.99 percent by weight or more of silica and rarely contain more than one percent by weight of other compounds. The term "quartz", as applied to glass, excludes high-silica glasses, such as Vycor, containing 96 percent by weight of silica.

The term "high-purity quartz" as used herein refers to fused silica or quartz glass containing more than 99.99 percent by weight of silica and no more than about 50 parts per million (ppm) of contaminating metallic ions. The term "ultra-pure" as applied to silica or synthetic quartz glass suggests a silica content of at least about 99.998 percent by weight.

The term "refractory" as used herein with respect to a glass or glass composition indicates the ability of the glass to withstand temperatures as high as 1500° C. as are encountered in the casting of iron.

The dictionary term "micronized" is used herein with respect to particles which have been ground or pulverized to provide an average particle size no greater than 20 microns.

The term "beta OH value" is used in its normal sense to indicate the hydroxyl content of a quartz glass as measured by infrared spectroscopy. Such term is defined and described in some detail in U.S. Pat. No. 4,072,489. A conventional infrared spectrophotometer is used to measure the transmissivities of the silicon hydroxyl vibrational bands in the near infrared at wave lengths of a few microns. The beta OH value is based on the transmittance of the sample at 2.6 microns and on the transmittance at the OH absorption peak, which is about 2.73 microns for quartz glass. Such value is calculated using a logarithmic formula as set forth in U.S. Pat. No. 3,531,306. An infrared absorption beta OH value of 0.04 would indicate a hydroxyl content of less than 50 ppm.

The term "sintering temperature" is used herein to indicate a temperature of at least 1300° C. sufficient to cause the silica of the porous preform to coalesce, to cause the pores of the preform to close, and to obtain a high density.

Unless the context suggests otherwise, the term "vacuum" is used herein to describe a substantial vacuum (i.e., a pressure of no more than 10 torrs). A "high vacuum" is a subatmospheric pressure no greater than about 1 torr (1000 microns).

The term "reactive groups" as used herein with respect to a porous silica body or silica particles refers to hydroxyl- or halogen-containing groups (e.g., surface≡Si-OH groups) or other reactive or unstable groups which promote nitridation of the silica and chemical bonding of nitrogen atoms or amine groups to some of the silicon atoms when the silica is heated in a suitable nitrogen reducing atmosphere.

As used herein, the term "colloidal silica" refers to extremely small silica particles having an average particle size of from 1 to 100 nanometers (i.e., less than 0.1 micron).

The term "ultrapure" as applied to natural or synthetic silica indicates that the metallic impurities other than aluminum do not exceed 4 parts per million (ppm). An "extremely pure" silica contains up to 15 ppm of aluminum and a total of no more than 8 ppm of other metallic ions.

The term "high-porosity" as applied to a silica preform relates to the total volume of the pores or internal cavities rather than the width or diameter of the pores and suggests a porosity of from 25 to 30 volume percent or greater.

The term "transparent" as applied to sintered quartz glass is used in the normal sense to define clear full-density glass and does not require glass approaching optical grade. The term covers typical helium-sintered glass containing a large number of bubbles with a diameter of from 1 to 10 microns and a substantial number of larger bubbles including some that are readily visible. Bubbles are considered "visible" if they have a diameter of at least 120 microns and are visible to the naked eye without magnification. A sintered transparent quartz glass is considered to have sound optical quality and utility for some optical uses if it has a minimal bubble content and no more than a small number of readily visible bubbles (i.e., an average less than one per square inch). In a sintered glass of "minimal" bubble content, the average bubble size is less than 6 microns and the glass is usually substantially free of large voids or bubbles with a diameter of 200 microns or more.

Silica particles are "electrophoretically mobile" in an aqueous suspension or slip when the negative charge on the particles is such that they can be readily attracted to a positive electrode.

It will be understood that, unless the context suggests otherwise, parts and percentages are by weight rather than by volume.

DESCRIPTION OF PREFERRED EMBODIMENTS

The present invention is particularly concerned with the manufacture of high-purity vitreous silica or quartz glass products from refractory silica compositions which are molded and sintered to densify the glass. The methods and apparatus used in the practice of the invention may be similar to those described in U.S. Pat. Nos. 4,072,489 and 5,053,359.

The invention involves formation of a shaped porous silica body or preform from a refractory composition or a slurry of fine silica particles by slip casting (See U.S. Pat. No. 4,072,489), by hot isostatic pressing, by electrophoretic deposition, by injection molding (See U.S. Pat. No. 3,222,435) or by other suitable methods (See U.S. Pat. No. 3,619,440). A unique gel-casting process can also be employed.

High-purity silica or fused quartz may be pulverized, micronized or reduced to appropriate micron size as described in U.S. Pat. No. 4,072,489 while maintaining the desired purity. A slurry or slip containing micronized particles of high-purity silica is preferably prepared by wet milling in a conventional ball mill having balls or stones formed of essentially pure fused quartz. The liquid employed during milling is preferably distilled water rather than an organic liquid. After milling, the average particle size of the silica particles is from 2 to 10 microns.

In the practice of the invention, it is usually preferable to employ high-purity silica or fused quartz with a silica content of 99.99 percent or higher. Natural or synthetic fused quartz with a reported silica content of at least 99.999 percent by weight is available commercially. Such ultra-pure silica can be produced by hydrolysis of silicon tetrachloride or ethyl silicate (TEOS). Extremely pure silica can also be produced from high-purity quartz sand that has been treated to remove impurities.

Certain embodiments of the present invention involve the use of a sol-gel process to form synthetic vitreous quartz of high purity from a silicon compound, such as silicon tetrachloride or a silicon alkoxide. A sol prepared from the silicon compound may be hydrolyzed to form a solution which is thereafter polymerized to form a silica gel.

The silicon compound is preferably an organo-silicate or alkoxide, such as methyltrimethyloxysilane, tetraethyl orthosilicate (TEOS), tetramethyl orthosilicate (TMOS) or other alkyl silicate (e.g., propyl silicate). The organic compounds preferred for use in the practice of the invention are disclosed in U.S. Pat. No. 4,789,389 and have the formula $Si(OR)_4$ or $Si\,R(OR)_3$ where R is an alkyl group.

Ethyl silicate, for example, can be synthesized from silicon tetrachloride and anhydrous ethyl alcohol. Partially hydrolyzed ethyl silicate (TEOS) is available commercially (e.g., SILBOND, a product of Akzo Chemicals, Inc.), and can be used.

A silicon alkoxide, such as ethyl silicate, can be hydrolyzed in the presence of an acid or base. The reaction can be described by a simple formula where 1 mole of ethyl silicate plus 2 moles of water theoretically produce 1 mole of silicon dioxide and 4 moles of ethanol, but actual hydrolysis is not this simple. Many intermediate species of polysilicates are formed during hydrolysis which grow in chain length until most or all of the ethyl groups are driven off and a non-linear network of —Si—O—Si— remains. After the hydrolyzed ethyl silicate is gelled and dried, it forms silica.

Commercial ethyl silicate binders can be produced by partially hydrolyzing TEOS under carefully controlled conditions to provide a stable mixture of polysilicon-oxygen "prepolymers" which can be stored and subsequently hydrolyzed to completion by adding an appropriate amount of water and changing the pH to an unstable range by using a gelling agent.

The preparation of silica glass from silicon alkoxides is described in U.S. Pat. Nos. 4,622,056 and 4,789,389. The catalyst used for hydrolysis may be a base, such as ammonium hydroxide, or an acid, such as hydrochloric acid, nitric acid or formic acid. The gelling catalyst used to adjust the pH of the hydrolyzed alkyl silicate may be an acid or a base. Excellent results can be obtained using a weak base, such as morpholine or urea, to effect gelling. Other bases which may be useful are disclosed in U.S. Pat. No. 4,680,048 (e.g., triethylamine, pyridine and aniline).

PRIOR DISCLOSURE

Copending patent application Ser. No. 07/767,691, filed Sep. 30, 1991 U.S. Pat. No. 5,389,582, describes an invention of Ted A. Loxley relating to a unique gel-casting process and to a process for producing transparent quartz glass of exceptional quality using hydrolyzed organo-silicates or silicon alkoxides, such as ethyl silicate (TEOS), methyl silicate (TMOS) methyltrimethyloxysilane, or other organic silicon compound. Said organic compound, which is disclosed in U.S. Pat. No. 4,789,389, has the formula $Si(OR)_4$ or $SiR(OR)_3$ where R is an alkyl group.

That invention is particularly useful in the manufacture of transparent homogeneous bubble-free glass of very high quality. For example, cristobalite-nucleated vitreous quartz glass receptacles or crucibles made in accordance with the invention of U.S. Pat. No. 5,053,359 or said copending application are greatly improved when the porous silica body (preform) is completely impregnated with a hydrolyzed silicon compound or silica sol prior to sintering of the glass to full density. Such silica sol may be prepared by hydrolysis of silicon tetrachloride or a derivative thereof such as TEOS.

As disclosed in said patent application, the hydrolyzed TEOS fills the pores of the preform and functions to eliminate gas bubbles in the glass resulting from large pores in the preform. It also serves like a sintering aid and permits sintering of the silica at lower temperatures. Optionally the TEOS in the pores of the silica preform can be gelled in an atmosphere of ammonia at room temperature, thereby assuring uniformity in the sintered product.

Impregnation of the pores of the porous silica preform with a hydrolyzed silicon compound, such as TEOS, serves another purpose. For some reason, perhaps due to the formation of silicon monoxide gas, the TEOS facilitates the removal of alkali metal ions. Near the outer surface of the glass product the percentage of alkali metal ions can be greatly reduced, perhaps more than 50 percent in some cases.

In the manufacture of a slip-cast quartz glass receptacle, such as a crucible, the preferred procedure is to impregnate the entire silica preform with a hydrolyzed silicon compound, such as TEOS, gel the solution in ammonia, dry the preform, sinter the preform in a vacuum furnace at a temperature of from 1200° C. to 1400° C. to a high density, and thereafter heat the densified preform in a vacuum furnace or in a helium atmosphere to provide a transparent full-density quartz glass.

The aforesaid Loxley invention also includes a unique process for gel casting which has great potential in the industry and makes it commercially practical to produce high-quality silica products which could not be made by slip casting. The process involves the addition of TEOS or other suitable organo-silicate to an aqueous slurry having a high silica content, such as 80 to 85 percent, and hydrolyzing the TEOS in situ during subsequent mixing. A gelling agent or catalyst, such as morpholine or other weak base, is added to the hydrolyzed slurry just before casting to cause gelling or polymerization of the solution.

An illustrative example of the gel-casting process which follows is described in said copending application. An aqueous slurry is prepared in a ball mill having a solids content of about 82 percent and a pH of about 2 to 4 and containing fused quartz particles with an average particle size of from 6 to 8 microns. A minute amount of micronized particles of basic aluminum acetate is thoroughly dispersed in the slurry and TEOS is then mixed with the slurry along with a small amount of hydrochloric acid to promote hydrolysis and ethanol to improve miscibility. No additional water is added to the slurry. The liquid in the original slurry provides the water for hydrolysis of the TEOS and may be somewhat below or in excess of the stoichiometrically required amount. The mole ratio of water to TEOS can be 2:1 to 4:1 or higher.

The unique gel-casting method of this example helps to reduce some of the cracking and shrinkage problems associated with prior gel-casting processes, probably because the water responsible for the shrinkage problem has been minimized in amount. This unique method is particularly well suited to commercial manufacture of ultra-pure silica glass products and products that are unsuitable for conventional slip casting, particularly those having thick walls or complex shapes.

The basic Loxley invention is an important advance in the field of quartz glass and may be defined broadly in a generic manner as follows: A gel-casting process for manufacture of shaped quartz glass products wherein an acidic slurry is prepared consisting essentially of from about 15 to about 20 percent by weight of water and from about 80 to about 85 percent by weight of micronized silica particles, said slurry is fed into a shaping mold to form a silica body which is then dried and fired outside of the mold to provide a shaped silica preform with a porosity of at least about 15 volume percent, and said preform is heated to a sintering temperature of at least about 1500° C. in an inert atmosphere or in a vacuum to cause the silica to coalesce and to form a high-density quartz glass, said process being characterized in that a liquid organic silicon compound is added to said slurry, said compound having the formula $Si(OR)_4$ or $SiR(OR)_3$ where R is an organic hydrocarbon group; in that the mole ratio of said silicon compound to the water present in said slurry is preferably from about 1:6 to about 1:2; in that said silicon compound is hydrolyzed in situ under acidic conditions while being thoroughly mixed with the micronized silica particles; and in that a gelling agent is added to and mixed with the acidic slurry to initiate polymerization before the slurry enters the mold cavity.

Said slurry contains an amount of water from 15 to 20 percent by weight sufficient to hydrolyze said silicon compound in situ, the ratio of water to said silicon compound being selected to avoid excessive shrinkage during sintering and to reduce cracking. Said ratio can be from about 2:1 to about 4:1.

It will be apparent that the above gel-casting process can be modified and improved in various ways. Refinements, modifications, embellishments and illustrative examples are described hereinafter to facilitate a more complete understanding of the invention.

The gel-casting process can be used to make various quartz glass products including flat plates as indicated hereinafter in Example VI. The firing of the silica body and the final sintering as described in that example can be modified. For example the gel-cast silica body can be dried, fired in a vacuum furnace for 5 to 8 hours or more at a temperature of 1100° C., and then sintered rapidly in helium in an induction furnace to a temperature of about 1750° C. as in U.S. Pat. No. 4,072,489 to produce a full-density transparent quartz glass.

The aqueous slurry employed for gel casting may also be modified by replacing part or all of the high-purity vitreous silica particles with particles of high-purity alpha-quartz (sand) or cristobalite. The micronized silica particles of the slurry can, for example, consist of from 25 to 75 percent by weight of vitreous silica and from 75 to 25 percent by weight of crystalline silica. The final sintering in helium to a temperature of 1750° C. above the melting point of cristobalite can produce a transparent vitreous quartz product.

The gel casting process of the present invention is well suited to the manufacture of quartz glass products which are large or relatively thick and not well suited to manufacture by arc-fusion or slip-casting methods. When making thick parts it may be desirable to employ a slurry with particles of greater average particle size than normally used (e.g., 8 to 15 microns) or to add to the slurry a minor amount of larger particles.

The sintered quartz glass products made by the gel-casting or impregnation processes and techniques described above and in said copending application Ser. No. 767,691 are unique in that a minor portion of the silica in the porous silica preform is ultra-pure synthetic silica derived from a silicon alkoxide.

These inventions make possible the manufacture of ultra-pure transparent vitreous silica products of extremely high quality which have adequate homogeneity for some optical uses or for possible use in optical waveguides.

Heretofore optical glass of very high quality has been made from ultra-pure synthetic silica produced, for example by flame hydrolysis of silicon tetrachloride (See Corning U.S. Pat. No. 3,806,570). One commercial synthetic optical glass (Corning Code 7940) manufactured by flame hydrolysis has excellent optical qualities and exceptional transmittance in the ultraviolet. The refractive index, birefringence constant and high transmittance of this premium-quality synthetic quartz glass makes it well suited to many optical uses.

The present invention makes possible manufacture of quartz glass with the clarity and transmission characteristics needed for some optical uses. If desired, a hipping furnace may be employed to assure removal of any bubbles or voids remaining after sintering.

Nitrided Quartz Glass

A preferred embodiment of the present invention relates to the manufacture of high-purity nitrided silica glass products. In this embodiment a silica body or preform with a substantial porosity is formed or molded to the desired shape, dried, fired in air or oxygen, and then nitrided in a nitrogen-containing reducing atmosphere to cause bonding of nitrogen atoms to silicon atoms of the silica (e.g., $\equiv$Si—NH$_2$). The nitridation of the silica preform can be carried out prior to or during sintering of the preform.

The silica of the preform is preferably a vitreous quartz of high purity and may have a purity in excess of 99.99 percent by weight. If the silica preform is formed by gel casting as in the embodiment of the invention previously described, a substantial portion of the silica will be formed from hydrolyzed ethyl silicate. Before the silica preform is sintered to high density, it can be fired for 2 to 10 hours in air at a temperature of from 800° C. to 1250° C. to oxidize the hydrocarbons or other combustibles. A normal firing might be for about 3 to about 4 hours at a temperature of from 1050° C. to 1200° C.

When making nitrided quartz glass products according to this invention, the porous silica preform is provided with surface reactive groups, such as hydroxyl or halogen groups, which are unstable in the presence of ammonia and promote the nitridation of the silica at high temperatures. The amount of the hydroxyl groups or other reactive groups can be substantial, (i.e., at least 100 parts per million, ppm). That amount can be from 150 to 250 ppm or more.

In order to provide the desired hydroxyl content, the porous silica preform can be hydroxylated with steam at a high temperature, such as 400° C. to 1100° C. or more. The steam treatment increases the hydroxyl content at least about 30 percent and preferably at least about 50 percent. The treatment can be carried out before or during the firing of the preform in air or oxygen by having an appropriate amount of steam present during oxidation of the combustibles. If oxidation is effected in an atmosphere of oxygen and steam, the firing temperature could be as low as 500° C. The conditions during hydroxylation of the silica. preform should be selected to obtain the desired hydroxyl content prior to the nitriding step.

When the hydroxylated silica preform is nitrided under suitable conditions in a nitrogen-containing atmosphere, there is a reduction in the hydroxyl content and a commensurate increase in the amount of chemically-bound nitrogen. That amount should be an effective amount, no less than 25 ppm, and is preferably at least about 50 ppm. The nitridation can be carried out in such manner that the hydroxyl content is reduced 50 to 70 percent or more. The nitriding step can reduce the hydroxyl content of the quartz glass product to a low value, such as 10 to 20 ppm.

A dramatic improvement in the physical properties of high-purity sintered quartz glass can be achieved with a minute amount of chemically-bound nitrogen (e.g., less than 0.01 percent by weight). The minimum amount depends on the intended use for the quartz glass product.

When the desired minimum nitrogen content in the glass product is 100 ppm or more, an adequate amount of hydroxyl groups or other reactive groups should be provided in the porous silica preform. For example, hydroxylation of the preform may be desirable to provide an hydroxyl content of 150 to 200 ppm or more prior to nitriding. After nitriding the preform and sintering to almost full density, the infrared beta OH value may be very low.

Nitridation of the porous silica preform is more effective when using a strong reducing agent, such as anhydrous ammonia, to provide a hydrogen-nitrogen reducing atmosphere. It is also possible to use other reducing agents, such as hydrazine. An atmosphere suitable for effective nitridation can be obtained from cracked ammonia. A reducing atmosphere consisting of a corresponding mixture of nitrogen gas and hydrogen gas is less effective and may require more time to achieve the desired result. In carrying out the process of the present invention, the nitriding in the hydrogen-nitrogen reducing atmosphere is carried out at a temperature of from 600° C. to 1300° C., preferably from about 900° C. to about 1100° C.

The partial replacement of surface hydroxyl groups with chlorine by a pretreatment step may enhance the nitriding reaction.

Useful nitrided quartz glass products can be made according to this invention when using various nitrogen-containing reducing atmospheres during the nitriding step. If the reducing atmosphere is obtained from cracked ammonia, nitriding can, for example, be carried out for 30 minutes to an hour or more at a temperature of from about 900° C. to about 1100° C. If the reducing atmosphere consists of a mixture of nitrogen gas and a reducing gas, such as hydrogen, methane or carbon monoxide, nitriding could be carried out for 1 to 2 hours or more at a temperature of from 1000° C. to 1200° C. or more.

After the silica preform has been nitrided to provide the desired nitrogen-silicon bonding and the desired content of chemically-bound nitrogen, it is sintered to a high density, such as 98 to 99 percent. The final sintering may be effected in a conventional electric induction furnace at high temperatures, such as 1550° C. to 1750° C. Since the silicon-nitrogen bonds are unstable at temperatures above 1500° C., it is desirable to carry out the final sintering operation in a nitrogen reducing atmosphere. However, if the sintering is carried out in two stages and the pores of the preform are closed (See Example VI), the final sintering can be carried out in helium or argon or other inert gas.

Nitrided quartz glass products made according to the present invention have remarkable physical properties even when the amount of chemically-bound nitrogen in the glass is very small. For example, the viscosity of quartz glass at 1260° C. can often be increased 50 percent or more by a nitriding treatment which provides the glass with a nitrogen content of less than 0.02 percent by weight. The same nitriding treatment may at the same time provide the quartz glass with an incredible increase in the resistance to devitrification.

A basis for comparison can be provided by slip casting two identical silica preforms from the same slurry (e.g., the slurry of Example I). One porous preform is dried, fired in air for about 3 hours at 1150° C. to oxidize the combustibles, and then sintered in helium in a semi-automatic induction furnace as described in U.S. Pat. No. 4,072,489. If the other identical preform is dried and fired in essentially the same way but subjected to a nitriding treatment in ammonia at 1100° C. (as in Example I) and then sintered in nitrogen to almost m full density in the same induction furnace in essentially the same way, the improvement in the physical properties can be almost unbelievable.

While superior results can be obtained by sintering in two stages or by using two or more furnaces as advocated in the illustrative examples which follow, it will be understood that some advantages of the invention can be obtained using a single electric induction furnace of the type disclosed in U.S. Pat. No. 4,072,489 in which nitriding is effected in a reducing atmosphere consisting of nitrogen gas and a reducing gas, such as hydrogen, methane or carbon monoxide, and at a relatively high temperature, such as 1400° C. to 1600° C. or higher, in a short period of time, such as 10 to 30 minutes. After nitriding the sintered preform may be further heated to a temperature above 1700° C. to provide a high density, such as 98 to 99 percent by weight, and/or to eliminate cristobalite.

While the porous preform is nitrided and sintered in the induction furnace at a temperature above 1400° C., it is preferable to cause pressurized nitrogen gas to flow through the preform as by use of a perforated or porous graphite support, such as the graphite mandrel (16) described hereinafter in Example I. The porous graphite support used during sintering of a glass crucible could, of course, be concave or convex.

When making simple articles, such as quartz glass receptacles, slip casting is usually employed to form the porous preform prior to nitriding. When conventional plaster of Paris molds are used for slip casting, the calcium ions introduced into the preform serve as a catalyst to promote nitriding. It will be understood, however, that the presence of calcium ions is not essential and that the preform need not be formed by slip casting.

Electrophoretic Deposition

Another important embodiment of the invention relates to the manufacture of quartz glass articles by an electrophoretic deposition process as described heretofore and as illustrated hereinafter in Example VI.

The process is preferably carried out using an aqueous slurry consisting of pure water and high-purity micronized silica particles which have been provided with a negative electrical charge sufficient to provide electrophoretic mobility. Such a high-purity slurry can be prepared by wet milling silica in a ball mill for 24 to 36 hours and contains from about 15 to about 20 percent by weight of water. It preferably has a solids content of at least 80 percent by weight. The micronized silica particles usually have an average particle size of from 5 to 10 microns and can have an average particle size of from 2 to 10 microns and usually consist of fused quartz but can include substantial amounts of crystalline silica (e.g., cristobalite or alpha quartz). It is sometimes advantageous to employ a slurry wherein 25 to 75 percent by weight of the silica is crystalline silica.

The particle size distribution in the slurry can be important and the particle sizes are preferably preselected or kept within predetermined ranges to assure that the deposits at the positive anode are porous and do not seriously interfere with formation of a relatively thick deposit. The silica particles of the slurry should be substantially free of colloidal silica and preferably comprise no more than one percent by weight of silica with a particle size of one micron or less and no more than 40 percent by weight of silica with a particle size of from 2 to 3 microns. The silica particles usually consist of at least 40 percent by weight of particles with a particle size of from 6 to 20 microns.

The process of this invention may be carried out using relatively simple equipment including one or more tanks or reservoirs with a volume of 20 to 40 gallons, each having a rotary mixer or the like, one or more negative anodes, and electrical means for providing a direct current to cause electrophoretic deposition on positive anodes immersed in the slurry. The slurry containing the micronized silica particles preferably has a pH of from about 3 to 5 and usually contains added ammonium ions that improve the conductivity of the slurry without contaminating the same with unwanted metallic ions.

In the manufacture of receptacles, such as crucibles, acid tanks, bell jars and the like, a number of cup-shaped metal shaping molds can be used which serve as positive anodes with electrically conductive shaping surfaces on which the silica is deposited (e.g., when a series of such molds are immersed in the slurry). In a typical cup-shaped aluminum mold with a diameter of 4 to 12 inches and a height of 2 to 10 inches, for example, a relatively thick deposit can be formed by electrophoresis in a relatively short period of time.

As the silica is deposited at the mold (anode), the percentage of water in the vicinity of the anode tends to increase and the average solids content of the slurry will gradually decrease. The process of this invention is preferably carried out in such manner that the water content of the slurry is controlled, the solids content of the slurry near the anode always being maintained at 80 percent by weight or higher. This can be achieved by agitating the slurry in the tank to cause excess water to move upwardly and by periodically adding silica particles to the slurry or by removing water from the slurry. If desired a permeable membrane can be used to separate water from the slurry. The agitation of the slurry in the tank or reservoir maintains the particles in suspension is preferably effected by a conventional rotary mixing means. Such agitation is preferably continuous to maintain a homogeneous mixture.

Electrophoretic deposition by the process of this invention facilitates the manufacture of special engineered quartz glass products which cannot readily be produced by other methods. A layer of any desired thickness can be deposited at the anode or shaping surface by temporarily immersing the anode in the slurry for a predetermined period of time, and a multilayer silica body can readily be produced by immersing the same anode in a series of different slurries in different tanks. By providing a series of different tanks, each containing 10 or more gallons of a suitable slurry and the associated means for carrying out electrophoretic deposition, a porous multilayer silica body or preform can readily be formed by immersing the shaping mold or anode in several different slurries sequentially.

In this manner it is convenient to form a porous silica preform having an ultrapure inner layer and other layers of lesser purity or a preform having a middle layer with a coefficient of expansion greater than that of outer layers, whereby the article produced after the final sintering in an induction furnace is a tempered quartz glass with outer surface portions under compression. A higher coefficient of expansion in the middle layer can be obtained, for example, by changing the chemical composition of the silica particles in the slurry (e.g., by adding an aluminum compound, such as aluminum oxide).

Various engineered glass articles can be produced from special multilayer silica preforms made by electrophoretic deposition. It becomes possible to provide unique products and to realize the untapped potential of glass, perhaps by reducing the microflaws which are present in all glass products and limit the strength and durability of the glass.

Multilayer silica preforms make possible the manufacture of unique and unusual quartz glass products with special characteristics. For example, a cup-shaped silica preform can be produced with an ultrapure inner layer and a number of additional layers with different calcium contents that increase in each successive layer. When such a preform is nitrided in accordance with the first-described embodiment of the present invention, the calcium acts as a catalyst, and the degree of nitriding can be increased accordingly so as to be greatest at the outer surface portions.

The electrophoretic deposition process of this invention and the equipment used to carry out the process as described above can also be used in a somewhat different manner for rapid production of thick quartz glass products by employing relatively large pieces of fused quartz to fill an electrically conductive shaping mold (anode) and then depositing micronized silica particles in the void spaces between such pieces. The pieces may, for example, have a width or diameter of from 0.3 to 0.8 inch or more.

Crystalline Silica Preforms

The processes disclosed in the present application are well suited to the manufacture of extremely pure transparent or full density quartz glass products and involve the use of porous silica preforms preferably made from aqueous slurries of exceptional purity. Ultrapure quartz glass can be very expensive, especially when made from fused silica particles having a purity of 99.995 to 99.999 or better. On the other hand, treated quartz sand of extremely high purity is much less expensive.

Substantial savings and other benefits can be achieved when part or almost all of the vitreous (fused) quartz in the refractory composition is replaced by alpha quartz. It is much easier to remove impuritites from quartz sand than to produce extremely pure fused quartz. A large amount of electrical energy is required for the electric furnaces used to produce fused quartz. The savings in electrical energy that can be achieved by use of alpha quartz in the refractory compositions used are significant and perhaps as much as 3 kilowatt hours per pound.

The cost of producing extremely pure quartz glass can, for example, be reduced by providing a slip or slurry made from a refractory composition consisting essentially of no more than 75 percent by weight of vitreous silica and from 25 to 75 percent by weight of alpha quartz with a purity of from 99.99 to 99.999 percent or greater.

For example, in the manufacture of ultra-pure quartz glass products in accordance with this invention, the silica particles of the refractory composition can be wet milled in a ball mill to an average particle size of from 2 to 10 microns and can consist of 30 percent by weight of high-purity fused quartz particles and 70 percent by weight of high-purity alpha quartz (or cristobalite) particles. The crystalline quartz would be milled separately and then mixed with the micronized fused quartz particles. The slip-casting procedure and subsequent sintering operations could be essentially the same as when using fused silica particles only.

The final heating would preferably be to a temperature of about 1750° C. to form a full-density or transparent vitreous quartz product essentially free of cristobalite.

The use of substantial amounts of crystalline silica in the slurry can provide important advantages. The crystalline silica can slow down the sintering to permit longer sintering times or to assist in retaining the open-pore structure. The use of alpha quartz or cristobalite particles in the slurry makes it possible to employ a special high-temperature chlorine treatment process to remove impuritites from a porous silica preform.

For example, a silica preform containing 40 to 60 percent or more of cristobalite or alpha quartz with a purity of about 99.99 percent could be treated with chlorine gas one or more times at a high temperature of from 1100° C. to 1250° C. to remove contaminating metallic ions and substantially increase the purity of the silica preform.

In order to provide an effective chlorine treatment the porous silica preform is alternately subjected to a vacuum and to chlorine gas so that all of the gases are removed from the pores and the pores are then filled with chlorine gas while the preform is heated for 30 minutes or more. This cycle can be repeated one or more times to achieve further improvement in the purity of the silica body or preform.

The methods and procedures described and the unique refractory compositions advocated in the examples of this specification or set forth as preferred embodiments are merely illustrative and are not intended to limit the scope of the invention. They are practicable and should be appropriate and useful in attaining the major or important advantages of the invention.

EXAMPLE I

A high-purity fused quartz slurry is prepared by wet milling high-purity fused quartz (99.99% $SiO_2$) using ultra-pure deionized water and a high-purity fused quartz grinding media in a conventional ball mill. The silica particles are milled for about 24 to 36 hours to provide a slip or slurry with a pH of from 2 to 4, an average particle size of from about 5 to about 7 microns, and a solids content of from about 82 to 84 percent by weight. The pH of the slurry is adjusted to about 7.5 by adding some dilute ammonium hydroxide, and the slurry is mixed for an extended period of time to break up floccules or agglomerates.

In the making of a quartz glass receptacle in accordance with this invention, the above slurry can be employed for slip casting a cup-shaped silica body or preform in a conventional plaster of Paris mold using conventional drain-casting procedures similar to those described in U.S. Pat. Nos. 3,972,704 and 4,072,489. The slip-cast preform is air dried for about 24 hours in a warm drying room maintained at a temperature somewhat above 40° C. and then placed in an electric furnace and gradually heated to about 800° C. in an atmosphere of air and superheated steam. The preform is maintained at about 800° C. in such atmosphere for about 2 hours and then heated to about 1200° C. in such atmosphere for an additional 2 hours to assure complete oxidation of the hydrocarbons or combustibles. The amount of vaporized water or steam is adequate to provide the desired vapor pressure and to maintain the desired hydroxyl content in the preform.

After such firing the preform has a porosity of from 15 to 20 volume percent and should have adequate strength for handling. Except for a high hydroxyl content, the porous silica preform is conventional. The wall thickness is substantially uniform and may be from 5 to 7 millimeters, for example, in a cup-shaped receptacle with a diameter of 25 to 30 centimeters.

The preform is then placed in an electrically-heated vacuum furnace and a substantial vacuum is applied for about 15 minutes to remove air and steam from the internal pores. The pressure is preferably reduced below 2 torrs. The vacuum is then discontinued and anhydrous ammonia is admitted to the furnace and caused to fill said pores. The preform is then heated in the ammonia (nitrogen-hydrogen) reducing atmosphere for about 30 to 35 minutes at a temperature of about 1100° C. to cause nitridation at the inner surfaces of the pores.

Thereafter, the porous nitrided silica preform is cooled enough to permit handling and is mounted upside-down on the heated hollow graphite mandrel (16) of a semi-automatic electric induction furnace of the type disclosed in said U.S. Pat. No. 4,072,489. The preform is shaped to fit the mandrel. The sintering procedure may be similar to that disclosed in that patent, but the glass is sintered in a nitrogen reducing atmosphere rather than in helium. The mandrel is perforated and internally pressurized with nitrogen to cause the nitrogen to flow radially outwardly through the mandrel and the porous preform. Just before the preform enters the furnace chamber, the temperature of the mandrel and the furnace may be around 1300° C. to 1500° C. The mandrel and the porous preform are advanced into the furnace chamber to start the sintering cycle, and the furnace is heated at a rapid rate to increase the glass temperature from below 1400° C. to above 1600° C. and gradually to more than 1700° C. to cause the silica particles to coalesce and the glass to reach a high density.

The glass is preferably heated to about 1750° C. to assure that no cristobalite remains in the glass. When the glass reaches that temperature, as indicated by a pyrometer, the mandrel and the sintered receptacle are retracted out of the furnace and cooled to permit removal of the receptacle. The total time for the sintering operation in the induction furnace can be relatively short to minimize cristobalite formation and depends on the thickness of the glass and also the initial temperature of the mandrel. It may take from 8 to 12 minutes to provide the desired sintering.

A non-oxidizing atmosphere of nitrogen gas is provided in the induction furnace during the sintering operation which tends to avoid undesired decomposition reactions at the surfaces of the internal pores of the silica body which may occur at high temperature due to the instability of the silicon-nitrogen bonds. Such bonds are more stable in the presence of a nitrogen atmosphere or a nitrogen-hydrogen reducing atmosphere.

Sintering of the glass in nitrogen as described above produces a white, opaque quartz glass with a substantially uniform cellular structure. The sintered quartz glass receptacle can have a density in excess of 98.5 percent by weight.

The procedure described above can be modified in various ways. The ammonia atmosphere employed for nitridation of the preform can be replaced by a similar reducing atmosphere consisting of a mixture of nitrogen and hydrogen or carbon monoxide. A similar nitrogen-hydrogen mixture can also be used in the induction furnace during the final sintering operation.

The quartz glass receptacle produced by the procedure of this Example I has remarkable properties which one would not expect in view of the small amount of chemically-combined nitrogen actually present in the glass structure. The nitriding of the quartz glass effects a great increase in the viscosity of the glass at high temperatures above 1400° C. and an incredible increase in the resistance of the glass to devitrification.

Although the glass has a density of 98.5 percent or more, it provides exceptional resistance to radiation heat transfer because of the uniform network of minute pores. Such a glass has potentially great commercial value with respect to radiation heat shields, particularly for furnaces used in the semi-conductor industry.

EXAMPLE II

If a porous silica preform corresponding to the preform of Example I is sintered in a helium atmosphere to produce a clear full density quartz glass receptacle, it may be advantageous to fill the pores of the preform with a silica gel prior to firing. The preferred procedure is to impregnate the entire silica preform with a tetraethyl orthosilicate (TEOS) which has been hydrolyzed with a suitable acid or base. Such hydrolyzed TEOS can be produced from a mixture of TEOS (i.e., SILBOND PURE) with water and a small amount of hydrochloric acid as disclosed, for example, in U.S. Pat. No. 4,789,389. The mole ratio of water to TEOS can be from 6:1 to 10:1

In this Example II a porous silica preform identical to the preform of Example I is slip cast and dried for 24 hours at a temperature of about 43° C. and then soaked and completely impregnated with the hydrolyzed TEOS. After draining and removing the excess TEOS from the preform, the preform is placed in a closed container with ammonium hydroxide for 15 minutes or more to gel the TEOS which substantially fills the pores of the preform. Thereafter, the preform is dried for about 24 hours in air at about 43° C. and then fired in air in an electric furnace for about 3 hours at about 1100° C. to oxidize the combustibles.

The resulting porous silica preform with a density of about 88 percent is then removed from the furnace, placed on the perforated mandrel (16) of the semi-automatic induction furnace and sintered in the manner described in Example I to a temperature of 1750° C. The sintering can be carried out in a helium atmosphere (or in a vacuum) according to said U.S. Pat. No. 4,072,489 and can produce a full density transparent quartz glass receptacle.

EXAMPLE III

A slip-cast silica preform impregnated with hydrolyzed TEOS as in Example II can be hydroxylated with superheated steam, nitrided with anhydrous ammonia, and sintered to high density in nitrogen generally in the manner described in Example I to produce an opaque all-vitreous quartz glass receptacle comparable to the receptacle of Example I.

In this Example III, the dried slip-cast preform is impregnated with hydrolyzed TEOS and treated with ammonium hydroxide to gel the TEOS as described in Example II. Thereafter the preform is dried in air at 43° C. for 24 hours and then placed in an electric furnace, heated to about 800° C., maintained at that temperature for about 2 hours in an atmosphere of air and superheated steam to hydroxylate the silica, and further processed, nitrided and sintered to high density in an induction furnace following the specific procedures described in Example I.

EXAMPLE IV

A high-purity fused quartz slip or slurry can be prepared essentially as described in Example I and has a pH of from 2 to 4, an average particle size of from 5 to 6 microns, and a specific gravity of about 1.84 (indicating a solids content of about 83.7 weight percent and a water content of about 30 volume percent).

Ten liters of this slurry are added to a cylindrical mixing vessel with a capacity of 30 to 40 liters formed of a suitable material, such as polyethylene. The vessel is equipped with a rotary mixer having a 4-blade mixing head with a diameter of about 15 centimeters which is normally driven at a speed of from 100 to 120 revolutions per minute.

After the aforesaid amount of the slurry has been added to the mixing vessel, the rotary mixer can be started and 10 milliliters (ml) of hydrochloric acid added gradually. The mixing at 100 to 120 rpm is continued while adding about 930 ml of TEOS (i.e., SILBOND PURE) and continues for one hour to allow hydrolysis to proceed. The reaction is exothermic and can cause the temperature of the slurry to rise above 50° C. (e.g., to perhaps 55° C. to 60° C. or higher). The rotary mixer continues to operate while the slurry cools.

After a few hours, when the slurry is at room temperature or a temperature below 25° C. and while the mixing continues, a small amount (e.g., 50 ml) of a one percent solution of morpholine in water is added very slowly, preferably over a period of 5 minutes or more depending on the amount used. The amount of morpholine used is selected to provide the desired gel rate and is such that the slurry remains flowable until all the morpholine is added even if partial gelling does occur. The slurry should be poured or caused to flow into the mold while it still flows easily (The ethyl alcohol produced during hydrolysis of the TEOS serves to improve the flow characteristics even if substantial gelling does occur).

The slurry is poured into a mold designed to produce a flat glass plate with a thickness of about 20 mm and diameter of 20 to 25 cm. Soon after the mold cavity is filled, the hydrolyzed TEOS begins to gel. The molded gel-cast preform should be allowed to gel in the mold for 1 to 2 hours or more and preferably remains in the mold overnight (e.g., 8 hours or more). By then it should have adequate strength and can be removed from the mold and dried in air at about 43° C. for another 24 hours.

The dried porous silica preform is then placed in a drying oven, gradually heated from room temperature to 120° C. at a slow rate (e.g., less than 50 degrees C. per hour) over a period of 2 to 3 hours, and held at about 120° C. for 48 hours to evaporate the free water and alcohol. The dried silica preform has a substantial porosity.

The dried gel-cast preform is then placed in a resistance-heated electric furnace and gradually heated in air to a temperature of about 1100° C. The rate of heating is low, preferably no more than 10 degrees C. per minute. The preform may be heated at 1100° C. for 1 to 2 hours or more in air to oxidize all of the combustibles (A shorter time and a lower temperature would be adequate if the furnace atmosphere was essentially oxygen rather than air).

Optionally, if a low hydroxyl content is required, the porous silica preform may be placed in a vacuum furnace after the above-described oxidation of the combustibles.

The optional vacuum-drying operation involves heating the fired preform in a vacuum furnace at a temperature of from about 1170° C. to about 1180° C. for about 3 hours to reduce the hydroxyl content of the glass to less than 50 parts per million (ppm) by weight. The subatmospheric pressure in the furnace during such heating is preferably less than 2 torrs.

After the porous silica preform is fired as previously described to eliminate combustibles, it can be removed from the furnace and placed in another resistance-heated electric furnace. The preform can be initially subjected to a substantial vacuum for a period of 10 to 15 minutes to remove gases from the internal pores and to reduce the pressure below 2 torrs. The operation of the vacuum pump is then stopped and helium gas is caused to flow into the furnace chamber and to fill the pores of the preform. The silica preform is heated gradually to a temperature of about 1400° C. or more over a substantial period of time, such as 1 to 2 hours or more, and in such manner that the preform is partially sintered to close the pores.

Thereafter the gel-cast silica preform with a density of about 95 percent can be placed in an electric induction furnace of the general type disclosed in said U.S. Pat. No. 4,072,489 and heated for 10 to 15 minutes in an inert atmosphere of helium or argon to a temperature of about 1750° C. to eliminate cristobalite and to sinter the quartz glass to full density. The final sintering in the induction furnace may be substantially as described in said U.S. Pat. No. 4,072,489.

A sintered product made according to this Example IV is a flat clear quartz glass plate of high quality having a thickness of about 20 millimeters. A similar procedure is suitable for making full-density quartz glass plates, receptacles or other shaped articles with a thickness of 20 to 30 millimeters or more.

The procedure advocated in this Example IV can produce clear quartz glass plate of good quality when using varying amounts of TEOS. For example, satisfactory results can be obtained when the amount of TEOS is increased from 930 ml to 1240 ml or is decreased from 930 ml to 620 ml per liter of slip.

EXAMPLE V

A high-purity slip-cast silica preform prepared in the manner described in Example I and having a porosity of about 15 volume percent is impregnated with hydrolyzed TEOS as in Example III. The TEOS is gelled, and the preform is dried in air at about 43° C. for about 24 hours in the manner described in Example III. The preform is then fired in air in an electric furnace at atmospheric pressure for 3 hours at about 1100° C. to oxidize and burn out the organic combustibles. The resulting cup-shaped silica preform can have a porosity of about 12 volume percent.

The preform can then be placed upside down in an electric resistance furnace, heated to about 1400° C., to 1500° C. and maintained at a temperature in that range for a period of time sufficient to increase the density to about 95 percent and to close the pores of the quartz glass article. During such heating, a high vacuum should be maintained in the furnace chamber, the pressure being less than 200 microns.

The resulting quartz glass receptacle can then be removed from the vacuum furnace, placed on the hot mandrel (16) of the semi-automatic induction furnace, and sintered in an inert atmosphere to a temperature of about 1750° C. substantially as described in U.S. Pat. No. 4,072,489 and in Example I. This can produce a full-density transparent quartz glass receptacle that has good optical properties.

It will be understood that the hydrolyzed TEOS used to impregnate the porous silica preform of Examples II, III, and V may be replaced with another hydrolyzed silicon alkoxide and that hydrolysis may be effected in the presence of ammonium hydroxide or other base (e.g., a Lewis base) rather than hydrochloric acid or other acid.

EXAMPLE VI

A slurry is prepared by wet milling ultrapure fused quartz using deionized water and ultrapure fused quartz grinding media in a ball mill. The silica particles are milled for about 30 hours to provide an extremely pure slip or slurry with a pH of from 2 to 4, an average particle size of from about 6 to about 8 microns, and a solids content of from about 82 to about 84 percent by weight. The milling time is adequate to provide negatively charged micronized silica particles with electrophoretic mobility. Dilute ammonium hydroxide is slowly added to the slurry which is thoroughly mixed to provide an extremely pure electrically conductive slip with pH of from 4 to 5.

About 20 gallons of a slurry prepared in this manner and having a solids content of at least 80 percent by weight is placed in a large tank or reservoir containing a negative electrode and a rotary mixer. A cup-shaped electrically conductive metal shaping mold with a diameter of about six inches and a height of about three inches is immersed in the slurry to provide a positive anode and a direct electric current is imposed to attract the silica particles to the anode.

The voltage is regulated and can be from about 100 to 120 volts while the thickness of the deposit on the shaping mold rapidly increases to 0.2 to 0.3 inch or more. If desired the voltage can be increased up to 200 volts to speed up the deposition after the deposit is relatively thick as when making large articles with a wall thickness of 0.4 to 0.5 inch or greater.

The slurry is continuously agitated by the rotary mixer during the electrophoretic deposition process to maintain the silica particles in suspension. The rotary blades of the mixer preferably have a speed of at least 150 revolutions per minute (rpm) high enough to control the water content of the slurry adjacent to the anode and to maintain substantial uniformity in the slurry.

After the cup-shaped porous silica body or preform deposited on the shaping mold has the desired wall thickness (e.g., a thickness of from 0.25 to 0.3 inch), the mold is removed from the slurry, the silica body is removed from the mold, dried and then fired at a temperature of 1050° C. to 1100° C. The resulting product with a porosity of at least 20 volume percent can then be sintered in helium for 8 to 10 minutes or more in an induction furnace to a temperature of about 1750° C. to provide a full density transparent glass receptacle. The final sintering in the induction furnace may be substantially as described in the aforesaid U.S. Pat. No. 4,072,489.

It will be understood that a procedure of the type described in this Example VI can be employed in the commercial manufacture of a variety of quartz glass receptacles and other products. The tank or reservoir can be of adequate size to accommodate at least several metal shaping molds (anodes) and more than one cathode, and additional slurry can be added or excess water removed to maintain the desired solids content.

It will be understood that variations and modifications of the compositions, methods, devices and products disclosed herein may be made without departing from the spirit of the invention.

What is claimed is:

1. In a process for making a quartz glass article from a preform, said preform comprising a porous silica body made by shaping a refractory composition consisting essentially of fine particles of high-purity silica and firing said body at a temperature of at least 1000° C., said process comprising heating the preform to a sintering temperature to coalesce the silica particles and form said article, the improvement wherein surfaces of internal pores of said preform are provided with reactive groups that cause reaction with nitrogen, and said preform is heated in a nitrogen reducing atmosphere in such manner as to provide the quartz glass with an effective amount of chemically-combined nitrogen to increase resistance to devitrification.

2. A process according to claim 1, wherein said preform comprises a shaped porous silica body formed from a high-purity slurry containing silica particles having an average particle size of from 2 to 10 microns, and said porous preform is sintered at a temperature of at least 1700° C. to coalesce the silica particles and to form a dense quartz glass article.

3. A process according to claim 1 wherein the preform is impregnated with a silica sol, gelled, dried, fired to remove combustibles, and subsequently heated to a sintering temperature above 1500° C. to coalesce the silica particles and to form a transparent quartz glass article.

4. A process according to claim 3 wherein said silica sol is prepared from a silicon alkoxide having the formula $Si(OR)_4$ or $SiR(OR)_3$ where R is an organic group.

5. A process according to claim 1 wherein said preform is nitrided in a nitrogen reducing atmosphere at a temperature of at least about 1000° C. to provide the silica glass article with a nitrogen content of at least about 50 ppm and wherein said silica body is provided with a substantial amount of a calcium catalyst to promote the nitriding reaction.

6. A process for manufacture of quartz glass receptacles wherein a shaped silica preform is produced by slip casting in a porous mold, the slip consisting essentially of water and micronized particles of high-purity silica, the silica preform is dried and fired to remove combustibles after being separated from said mold, and the fired preform is thereafter sintered to coalesce the silica particles, characterized in that said mold is a high-purity silica mold with a porosity of at least 20 volume percent having a generally uniform capillary network of open pores and in that, after each slip-cast preform has been removed from the mold, the mold is inverted and rapidly dried at a temperature of at least 250° C.

7. A two-stage process for producing quartz glass articles comprising preparing a porous silica preform from a high-purity aqueous slurry consisting essentially of at least about 80 percent by weight of high-purity micronized silica particles and up to about 20 percent by weight of water, drying and firing the preform to oxidize combustibles, presintering the preform for at least about one-half hour at a temperature of from about 1350° C. to about 1600° C., and thereafter sintering the glass to full density by heating it to a temperature above 1700° C. in a second stage.

8. A process according to claim 7, wherein the fired porous preform is thoroughly impregnated with a hydrolyzed silicon alkoxide which is gelled, dried and fired to reduce the porosity of the preform at least about 2 volume percent.

9. A process according to claim 7 wherein said preform is presintered for about 1 to 3 hours in helium or under vacuum to increase the density to at least about 90 percent before the second stage sintering is initiated.

10. A process according to claim 7 wherein the preform is presintered in a helium atmosphere.

11. A process according to claim 10 wherein said preform is mounted on a refractory mandrel during both sintering stages and helium gas at a temperature of at least 1400° C. is caused to move outwardly through the mandrel and the porous preform for at least 20 minutes, whereby the quartz glass has a minimal bubble content.

12. A process according to claim 10 wherein helium gas is caused to flow through the porous preform for at least 20 minutes during sintering.

* * * * *